Jan. 30, 1945. W. M. McCONNELL 2,368,151
LATHE CARRIAGE DRIVE
Filed Aug. 17, 1943 6 Sheets-Sheet 1
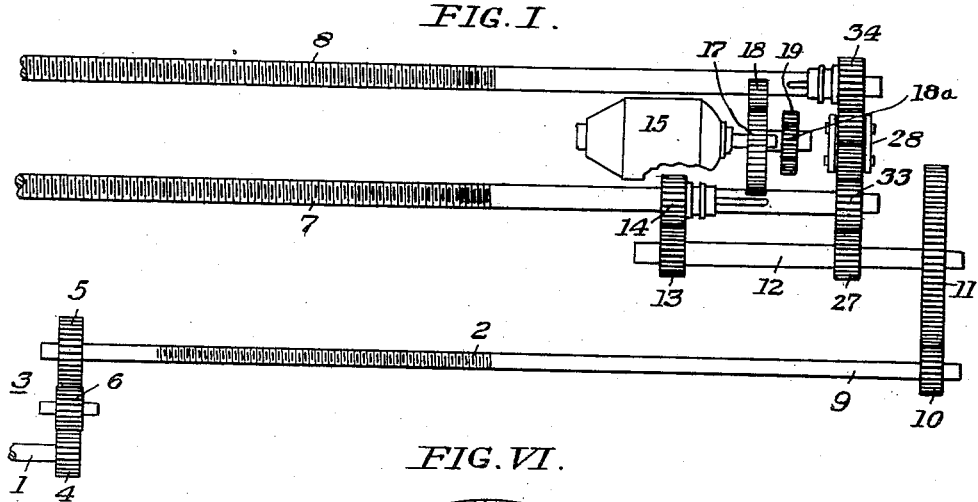
FIG. I.
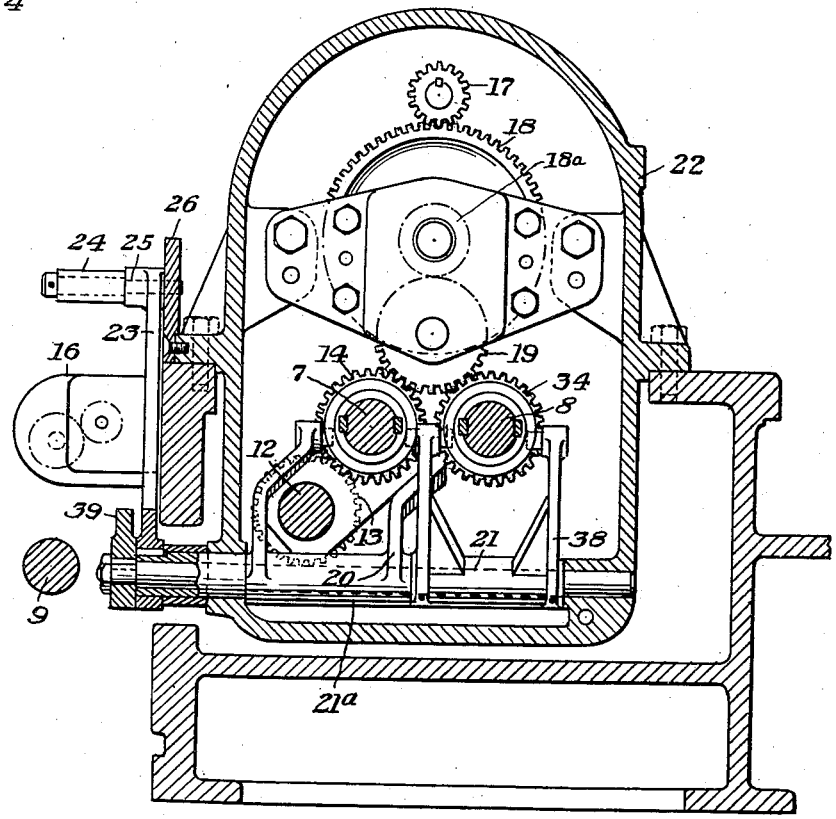
FIG. VI.
INVENTOR
William M. McConnell
by William B. Wharton
his attorney

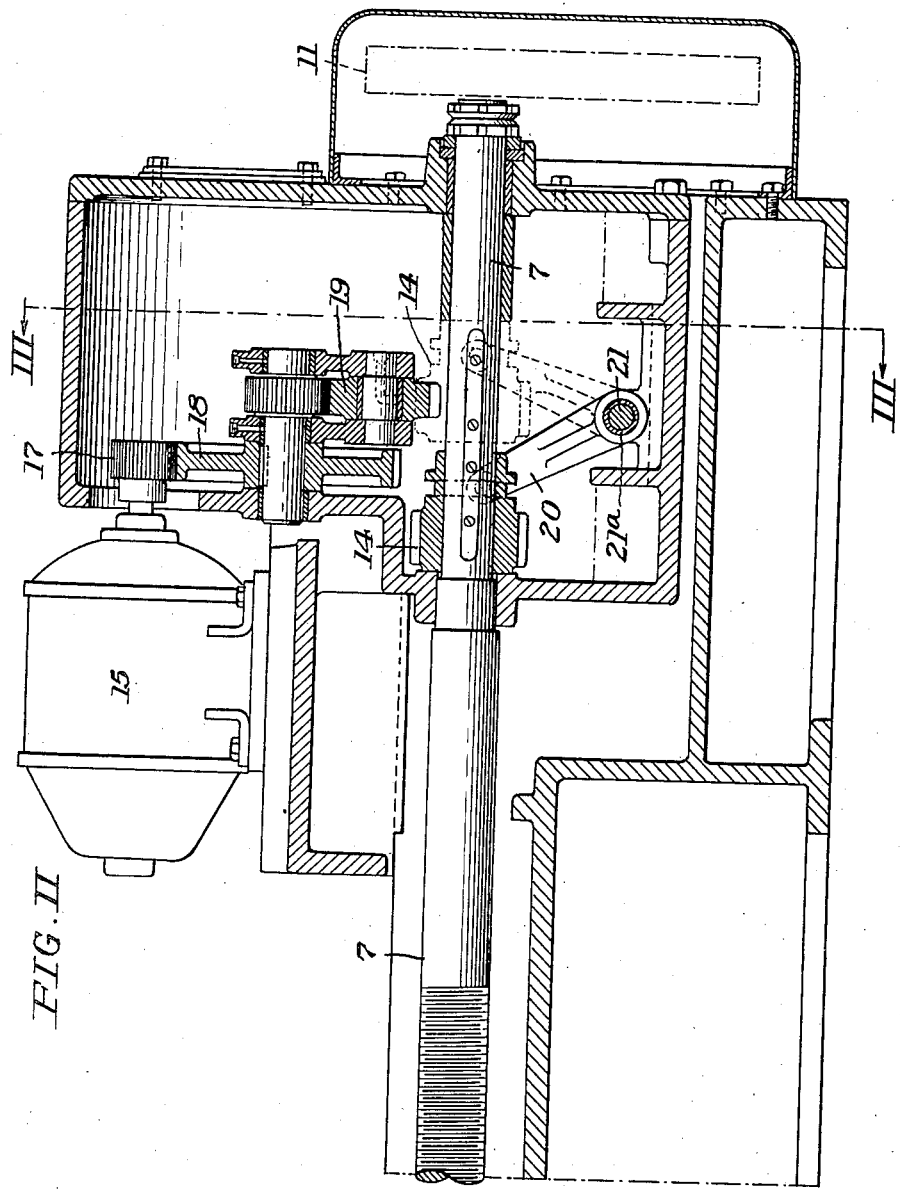

Jan. 30, 1945.   W. M. McCONNELL   2,368,151
LATHE CARRIAGE DRIVE
Filed Aug. 17, 1943   6 Sheets-Sheet 3
FIG. III.
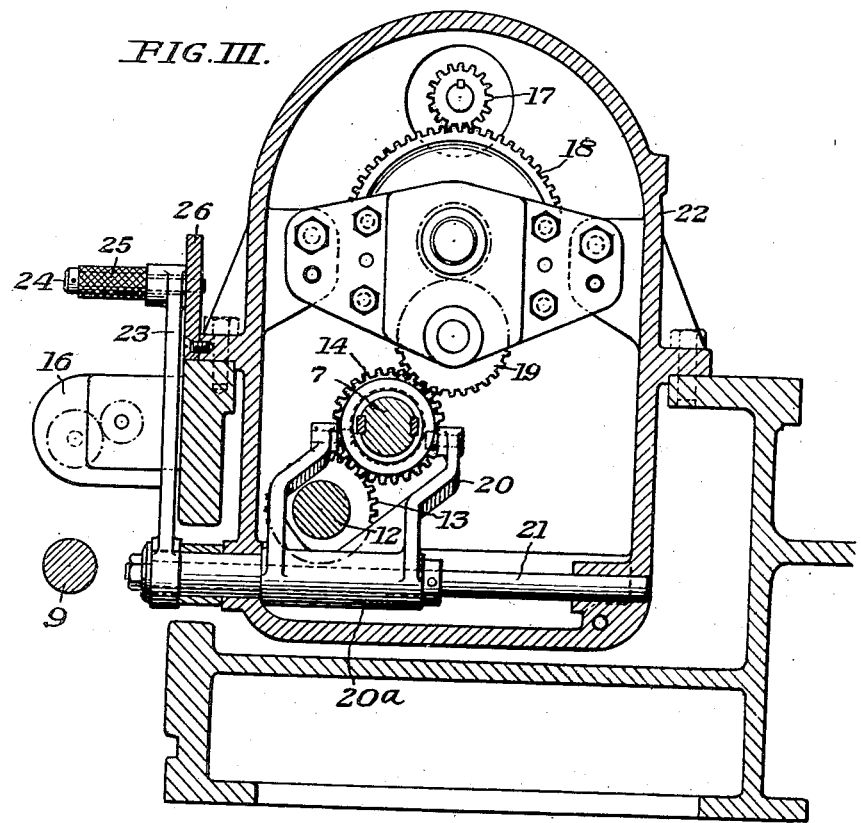
FIG. IV.
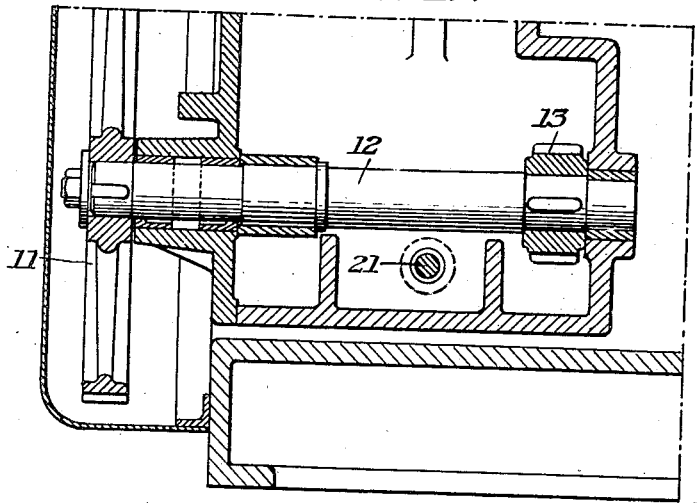
INVENTOR
William M. McConnell
by William B. Wharton
his attorney

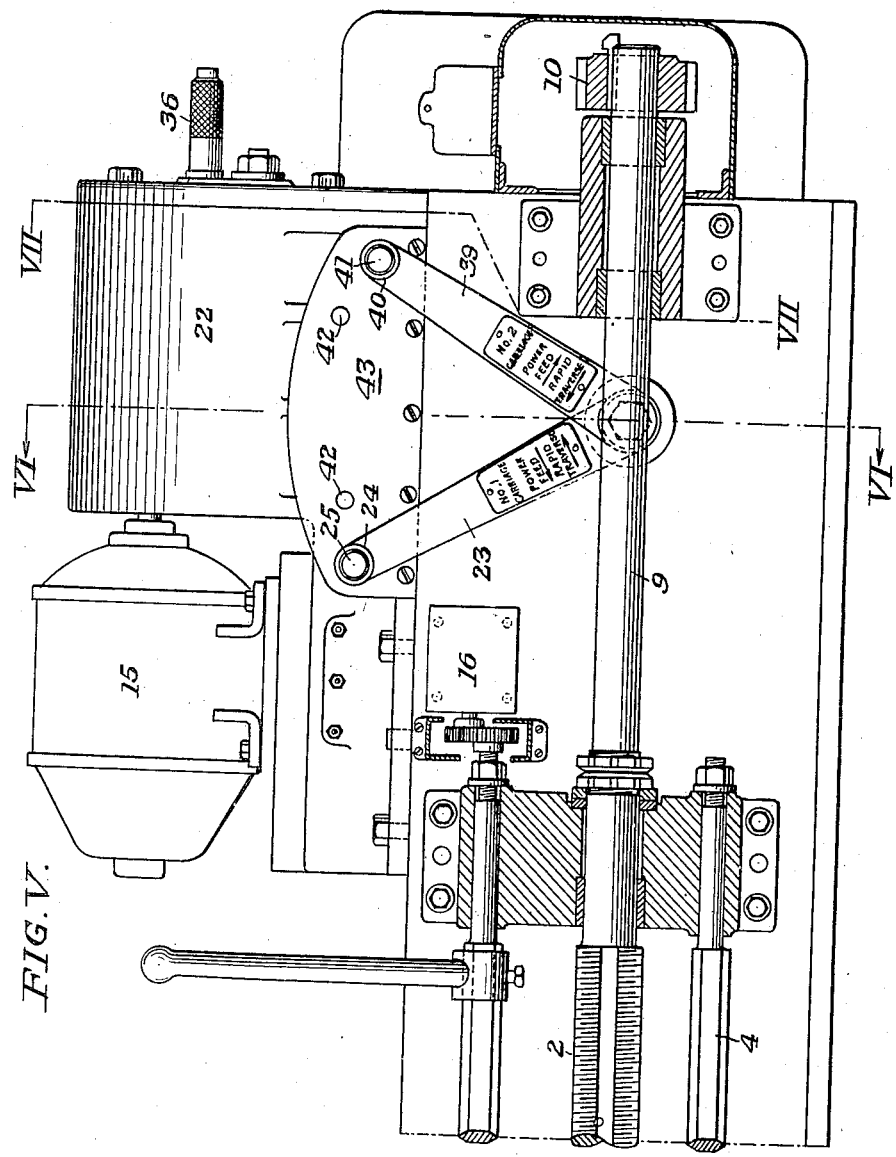

Jan. 30, 1945.  W. M. McCONNELL  2,368,151
LATHE CARRIAGE DRIVE
Filed Aug. 17, 1943  6 Sheets-Sheet 5
FIG. VII.
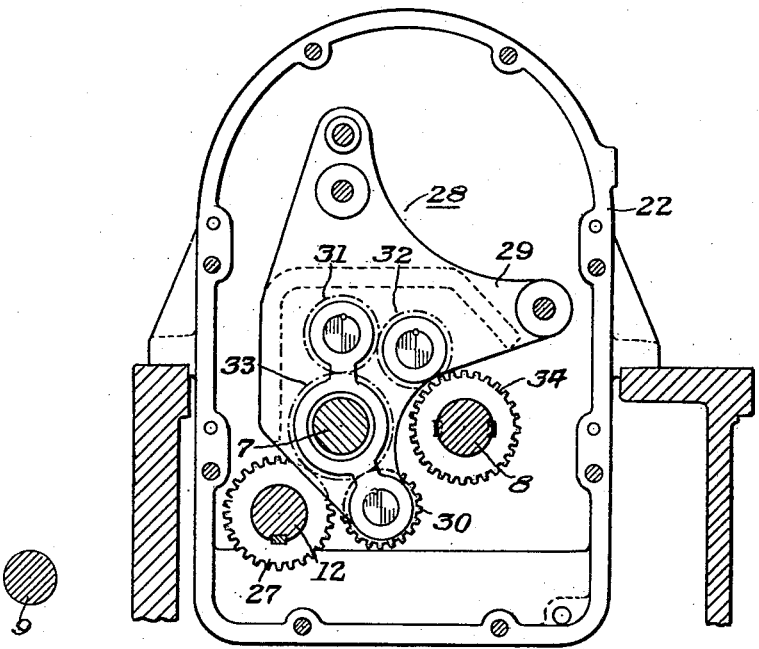
FIG. VIII.
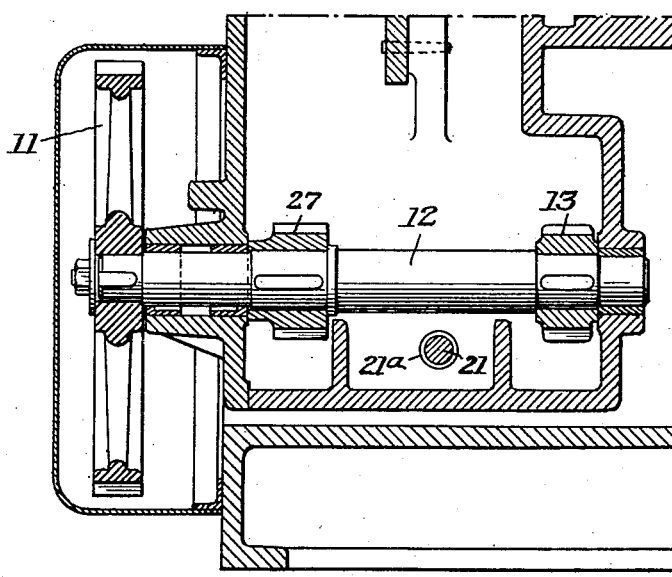
INVENTOR
*William M. McConnell*
by *William B. Wharton*
his attorney

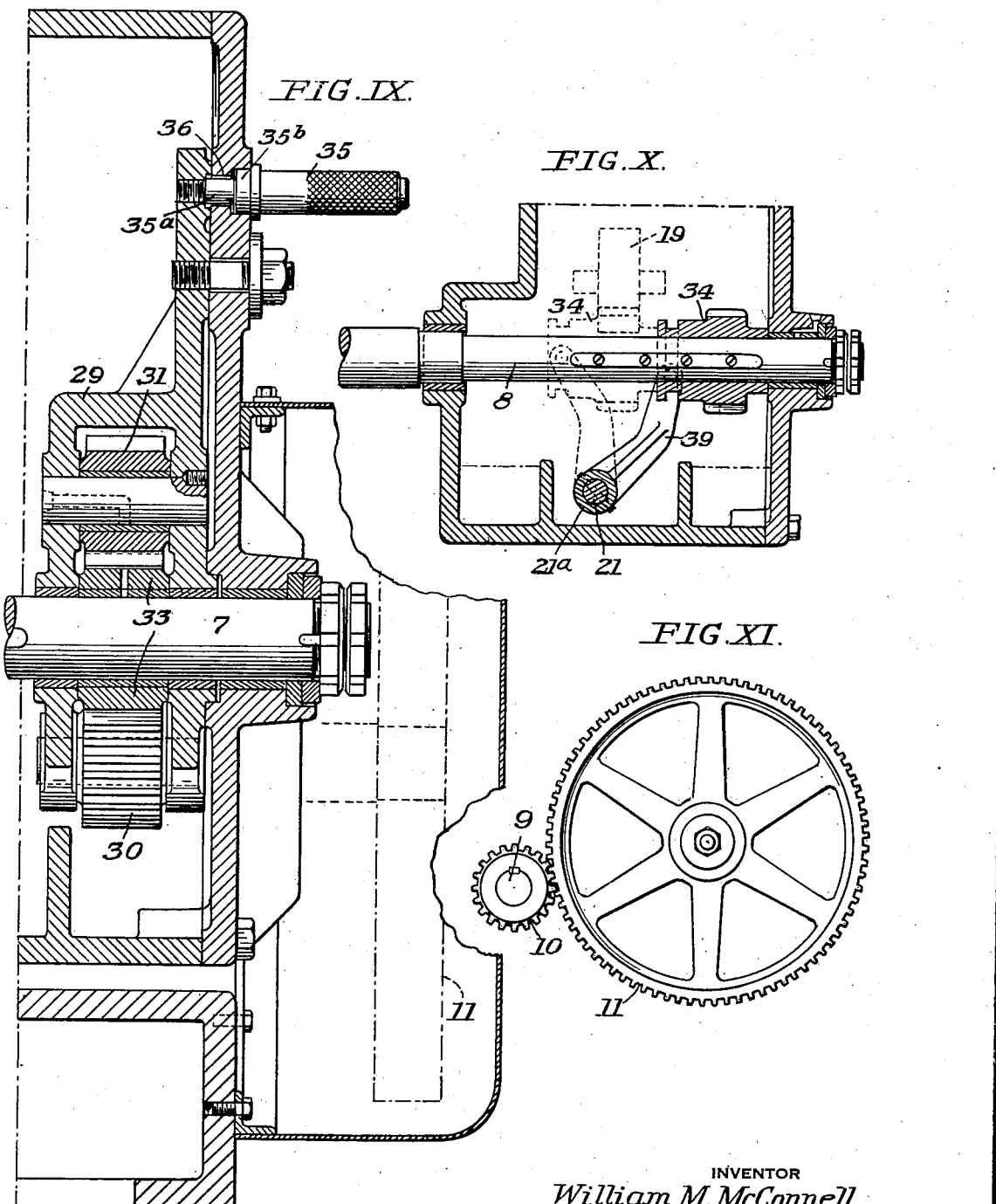

Patented Jan. 30, 1945

2,368,151

UNITED STATES PATENT OFFICE 2,368,151

LATHE CARRIAGE DRIVE

William M. McConnell, McKeesport, Pa., assignor to Mackintosh-Hemphill Company, Pittsburgh, Pa., a corporation of Delaware Application August 17, 1943, Serial No. 498,925

10 Claims. (Cl. 74—389)

This invention relates to carriage drives, used in moving a tool carriage or carriages of a lathe, and is particularly directed to such drives for heavy duty engine lathes.

In my co-pending application, Serial No. 446,205, filed June 8, 1942, I have disclosed an engine lathe provided with a carriage drive that includes a power-screw disposed longitudinally of the lathe bed and driven during power feeding of its engaged carriage by a feed shaft that is reversibly driven from the head stock of the lathe. At the tail end of the lathe the feed shaft drives change gears, one of which is slidable to a non-meshing position to interrupt the drive, the change gears driving a countershaft. The countershaft drives a pair of power-screws, one of them by direct geared connections, and the second by reversing tumbler gear connection with the first. A rapid traverse motor is connectable with the power-screws through a reduction gear-train and gears mounted on the screws and provided with clutches for clutching them to the respective screws. In that organization, change of the drive from power-feed through the feed screw to rapid traverse from the rapid traverse motor, involves multiplicity of changes of the mechanism, i. e., disconnection of the change gears by sliding one of them out of mesh, clutching of one or both power-screws to their driving gears, moving the tumbler system to a neutral position, and starting the motor. The mechanism includes an electrical interlock to prevent simultaneous rapid traverse and power-feed operation. I have found that clutches are relatively undesirable mechanical elements of a heavy duty lathe, because of their tendency rapidly to wear under heavy duty.

The present invention involves an improvement and refinement of the power-feed and rapid traverse drives, whereby the driving mechanism for each is greatly simplified, as is the procedure necessary to change operatively from one to the other of them. The mechanism includes no clutches.

An important feature of the lathe arrangement herein disclosed is that it provides for utilization of the power-screw, or power-screws, of the lathe assembly both to effect working, or power-feed, propulsion of the lathe carriage or carriages and to effect rapid traverse of the carriage or carriages. The driving arrangement provides for rotation of a power-screw in either direction relative to the direction of rotation of the face plate, so that a carriage connected with it may be moved along the lathe bed in either direction, irrespective of the direction of rotation of the face plate. In a lathe provided with two power-screws, an arrangement is provided for additionally driving them in either direction relative to one another. The organization provides for rapid traverse of either power-screw in either direction, and, since I regard it as preferable, particularly in lathes having long beds, to prevent simultaneous rapid traverse of two carriages, the system is provided with means for preventing simultaneous rapid traverse driving of both power-screws. This means comprises a simple mechanical interlock of controlling levers, made possible by the arrangement of the drive, and avoids resorting to complicated or expensive forms of electrical interlocks, or lockout devices that require an extra manipulation to make them effective or inoperative.

In the accompanying drawings:

Fig. I is a schematic view of the lathe carriage drive of my invention, showing the elements of the organization in position for power-feed actuation of two parallel power-screws.

Fig. II is a longitudinal vertical sectional view of a portion of the tail end of a lathe provided with a single power-screw, which embodies the driving organization of my invention.

Fig. III is a sectional view on line III—III of Fig. II.

Fig. IV is a detail vertical sectional view of the countershaft arrangement, by which power is transmitted from the feed shaft of the lathe to the power-screw thereof in the form of the lathe comprising a single power-screw.

Fig. V is a front elevation, partially broken, of the tail end of a lathe provided with two power-screws.

Fig. VI is a sectional view on line VI—VI of Fig. V.

Fig. VII is a sectional view on line VII—VII of Fig. V.

Fig. VIII is a vertical sectional view of the countershaft arrangement in the form of the lathe which comprises two power-screws.

Fig. IX is an enlarged longitudinal section of the reversing drive for the second power-screw.

Fig. X is a detail vertical sectional view showing the driving gear of one of the power-screws.

Fig. XI is a schematic view of gearing by which the main feed shaft of the lathe transmits power to the countershaft operatively connecting the power-screw or power-screws of the lathe with the main feed shaft.

Describing the drawings in detail, and referring to the diagrammatic showing of Fig. I, a connector shaft 1 is driven from the power mechanism of a lathe in a way that may be conventional, being geared with the face plate to produce a definite speed ratio between the face plate and shaft. The connector shaft 1 drives a feed shaft 2, through a reversing gear assembly 3, which may be of a type including a driving gear 4, a driven gear 5, and intervening tumbler gearing indicated at 6.

The feed shaft 2, as set forth in my prior application, may be used as a source of power for driving cross slides carried by carriages, and desirably is threaded to provide alternative connection for moving the carriages longitudinally of the lathe bed, as in thread cutting. The feed shaft 2 also serves as a source of power for one or more power-screws, shown in Fig. I as two in number and designated 7 and 8, each being arranged for longitudinally driving a carriage, as in straight or taper turning. Driving assemblies for rotating single and double power-screws, for power-feed of the carriages, or for their rapid traverse, are shown in Figs. II to X.

Describing first an assembly for driving a single carriage lathe, illustrated in Figs. II to IV, the feed shaft 2 at the tail end of the lathe is provided with an extension 9, the rear end of which carries a pinion 10, which meshes in driving relation with a gear 11 secured on a countershaft 12. Pinion 10 and gear 11 are change gears, so that changes in speed ratio between the countershaft 12 and the feed screw 2 can be made. The countershaft 12 carries a driving gear 13 arranged for meshing with a driven gear 14 that is splined to slide longitudinally on an extension of the single power-screw 7.

For rapid traverse of a carriage connected with power-screw 7, as by a split nut, a reversible rapid traverse motor 15 controlled by switch 16 is mounted at the tail end of the lathe, and has on its shaft a pinion 17 which drives a speed reduction gear-train having an initial gear 18 and pinion 18a carried thereby, and terminating in a gear 19 arranged laterally adjacent the power-screw 7 and in a position spaced longitudinally of the power-screw from the driving gear 13. The driving gears 13 and 19 are equidistant from the center line of the power-screw 7, so that the slidable gear 14 may be moved longitudinally from a position of meshing with one, through a neutral position, to a position of meshing with the other.

This movement of the slidable gear 14 is accomplished by a gear-shifting fork 20 carried by a traverse shaft 21 that projects through the front of the casing 22. An operating lever 23 is mounted on the end of the shaft 21 and is provided with a handle 24 in the form of a spring-pressed plunger 25 that cooperates with a plate 26 provided with a plurality of locating holes, and arranged for cooperation with the handle plunger to fix the lever 23 in the different positions it occupies when the slidable gear 14 is meshed with either of the gears 13 and 19.

This assembly provides a drive from the feed screw 2 to the power-screw 7 that includes no clutches, is simple to operate in changing between power-feed and rapid traverse, and that automatically prevents simultaneous connection of the power-feed and rapid traverse drives without employment of mechanical or electrical interlocks, as release of one drive occurs by unmeshing movement of the slidable gear 14 before that gear can be meshed with the driving wheel of the other drive.

Figs. V to X inclusive illustrate an organization in which, analogously to the schematic showing of Fig. I, the driving organization of the lathe includes two power-screws. Because this arrangement includes all the elements of the single power-screw structure, together with elements appropriate for driving a second additional power-screw, like parts are given in these latter figures of the drawings the same reference numerals applied to them in Figs. II, III, and IV.

Referring now particularly to Figs. I and V to X inclusive of the drawings, the driving connection from the feed shaft 2 to countershaft 12 is by change gears 4 and 5. The countershaft 12 carries two longitudinally spaced driving gears 13 and 27, which respectively drive the two power-screws 7 and 8.

A reversible rapid traverse motor 15 is mounted on the lathe bed, and through a motor pinion 17 drives a speed-reducing gear train having an initial gear 18 having a final gear 19, the center line of which latter gear is located above and between the power-screws 7 and 8. This gear 19 is longitudinally spaced between the driving gears 13 and 27 carried by countershaft 12.

The driving gear 13 drives the power-screw 7 by direct meshing with a gear 14 that is slidably splined on the power-screw 7 for longitudinal movement between a position of meshing with the gear 13 and a position of meshing with the final gear 19 of the rapid traverse assembly. For driving the other power-screw 8 in power-feed, and for reversing at will its direction of rotation relative to that of the power-screw 7, a tumbler assembly 28 is organized with the driving gear 27 of the countershaft. This assembly comprises a tumbler frame 29 mounted for oscillation on the directly driven power-screw 7, which for alternate driving connection with the power-screw 8 carries a single gear 30, and coupled gears 31 and 32. Each of these alternative gear connections is meshed permanently with an idler gear 33 rotatable upon the shaft 7, and which in turn is driven constantly by the gear 27 mounted on the countershaft. Rotation of the power-screw 8 in either direction can be accomplished by swinging the tumbler assembly to bring gear 30 or gear 32 of coupled gears 31 and 32 into driving relation with a slidable gear 34 splined on the power-screw 8. This swinging may be accomplished by moving a handle 35. Handle 35 has an inner stem 35a, which is movable in a slot 37 in the housing structure and has a threaded engagement with the tumbler frame 29. A shouldered extension 35b of the handle is spring-pressed into locking pockets which extend from the slot 36 in the structure of the housing 22, and which define the positions of the tumbler frame in which either the gear 30 or the gear 32 meshes with slidable gear 34.

The driven gear 34 is slidable on the power-screw 8 for longitudinal motion between a position of meshing with the driving gear 19 of the rapid traverse system and a position of meshing with the presented gear of the tumbler drive. Because the tumbler drive of the power-screw 8 and the direct drive of power-screw 7 are spaced longitudinally of the power-screws on opposite sides of the rapid traverse gear 19, movement of the gear 34 in shifting from the power-feed driving connection with the tumbler assembly to rapid traverse connection with the gear 19 is in opposite direction to that of the gear 14 in moving from its power-feed meshing with the direct driving gear 13 to rapid traverse connection with the gear 19.

Sliding movement of the gears 14 and 34 is respectively accomplished by shifting forks 20 and 38, carried on transverse shaft 21. In Figs. II to IV inclusive of the drawings shifting fork 20 is effectively a part of the shaft 21, the sleeve appearing in Fig. IV being merely a filler sleeve. In the structure of Fig. VIII, however, the shifting fork is carried by a sleeve 21a rotatable on shaft 21, and shifting fork 38 rotates with the shaft. In this arrangement sleeve 21a carries operating lever 23, and shaft 21 carries operating lever 39. These levers 23 and 39 respectively carry handles 24 and 40 that include spring plungers 25 and 41 cooperating with locating holes 42 in a plate 43 over which the ends of the levers sweep in moving the forks.

The levers swing through angular paths the defined positions of which represent positions of meshing of the gears that they control with the common rapid traverse gear 19 and with the individual power-feed drives. Their paths of movement from power-feed to rapid traverse positions are overlapped, by the arrangement of the angular positions of the levers relative to the respective shifting forks, and by the arrangement of the slidable gears on opposite sides of the rapid traverse gear 19. Consequently the levers move toward one another in shifting the gears toward meshing with the rapid traverse gear. This overlapping of the paths of the levers necessitates that in meshing one power-screw gear with rapid traverse the lever controlling that gear must pass the rapid traverse position of the other lever. The levers 23 and 39, or their handles 24 and 40 by their interference thus prevent simultaneous connection of both power-screws with the rapid traverse drive.

Since the power-feed positions of the levers are at the limits of their travel in receding from rapid traverse positions, and from each other, the two power-screws can be connected with their respective power drives at the same time, and either may be connected with the rapid traverse system while the other is connected with its power-feed drive.

It is to be understood that the embodiment of my invention herein shown and described is illustrative and not restrictive of my invention, and that the scope of my invention is to be limited only by the definition of the appended claims.

I claim as my invention:

1. A rapid traverse and power-feed system for a carriage operating power-screw of a lathe comprising a power-screw, a rapid traverse mechanism comprising a motor and a rapid traverse driving gear actuated thereby arranged adjacent the power-screw, a power-feed mechanism including a feed shaft reversibly driven from the main power source of the lathe, a countershaft in constantly driven connection with the said feed shaft and having thereon a power-feed gear arranged adjacent the power-screw and spaced longitudinally thereof from the rapid traverse gear, and a power transmitting gear non-rotatably mounted on the power-screw and slidable thereon between a position wherein the said gear meshes with the said power-feed gear on the countershaft and a position in which the said gear meshes with the said rapid traverse gear.

2. In a lathe provided with a carriage operating power-screw, a feed shaft parallel to the said power-screw and reversibly driven from the main power source of the lathe, a rapid traverse motor provided with an incomplete train of gears for rotating the power-screw from the said rapid traverse motor, means for driving the power-screw in power-feed comprising an incomplete set of gears for transmitting power from the said feed shaft to the said power-screw, and a gear connected in driving relation with the power-screw and movable between alternative positions in one of which it completes the rapid traverse gear-train between the rapid traverse motor and the power-screw and in the other of which it completes the power-feed gear-train between the power-screw and the feed shaft.

3. A rapid traverse and power-feed system for parallel carriage operating power-screws of a lathe comprising parallel power-screws, a rapid traverse mechanism that includes a rapid traverse driving gear arranged between the said power-screws, a feed shaft reversibly driven from the main power source of the lathe, a pair of feed-shaft driven gears supported in operative relation each to one of the said power-screws and spaced in opposite longitudinal directions from the said rapid traverse gear, and a slidable gear non-rotatably mounted on each power-screw arranged to be moved between a position in meshed connection with its operatively related feed-shaft-driven gear and a position in meshed connection with the said rapid traverse gear.

4. In a lathe that includes a reversibly driven feed shaft and parallel power-screws; a drive for the power-screws comprising a countershaft in constantly driven geared connection with the feed shaft, driving gears secured to the said countershaft in longitudinally spaced relation, a power transmitting gear non-rotatably mounted on each power-screw and slidable thereon, the said slidable gears being respectively movable in opposite directions from a position of each between the driving gears on the countershaft to a position in driven relation to one of such gears.

5. In a lathe that includes a feed shaft and parallel power-screws; a power-feed drive for the power-screws comprising a disconnectable one-way gear drive comprising a continuously driven power-feed transmitting gear from the feed shaft to one power-screw and an independently disconnectable reversible gear drive comprising a continuously-driven power-feed transmitting gear from the feed shaft to the other power-screw, a rapid traverse motor, a rapid traverse gear driven from the said motor and disposed between the two said power-screws and longitudinally between the power-feed transmitting gears from the feed shaft thereto, and a gear slidably and non-rotatably mounted on each of the said power-screws arranged to be moved by disconnection of each from association in a power-feed drive from the feed shaft into connecting engagement with the said rapid traverse gear.

6. In a lathe that includes a feed shaft and parallel power-screws; a power-feed drive for the power-screws comprising a disconnectable one-way gear drive comprising a continuously driven power-feed transmitting gear from the feed shaft to one power-screw and an independently disconnectable reversible gear drive comprising a continuously driven power-feed transmitting gear from the feed shaft to the other power-screw, a rapid traverse motor, a rapid traverse gear driven from the said motor and disposed between the two said power-screws and longitudinally between the power-feed transmitting gears from the feed shaft thereto, and a gear slidably and non-rotatably mounted on each of the said power-screws arranged to be moved by disconnection of each from association in a power-feed drive to the feed shaft into connecting engagement with the said rapid traverse gear, shifting means associated with each of said slidable gears to move its said associated gear into and from connected relation with the rapid traverse gear and a feed shaft driven gear, the said gear shifting means being so arranged that the said power-screws cannot simultaneously be connected for rapid traverse drive.

7. In a lathe that includes a reversibly driven feed shaft and parallel power-screws; a drive for the power-screws comprising a countershaft in constantly driven geared connection with the feed-screw, a disconnectable one-way gear drive comprising a continuously driven power-feed transmitting gear from the countershaft to one said power-screw, an independently disconnectable reversible drive comprising a continuously driven power-feed transmitting gear from the counter-shaft to the other said power-screw, a rapid traverse motor, a rapid traverse gear driven from the said motor and disposed between the two said power-screws and longitudinally between the power-feed gears driving from the countershaft, and a gear slidably and non-rotatably mounted on each of the said power-screws arranged to be moved into and from a position in the power-feed gear drive from the countershaft and a position in mesh with the said rapid traverse gear.

8. In a lathe that includes a reversibly driven feed shaft and parallel power-screws; a power-feed drive for the power-screws comprising a countershaft in constantly driven geared connection with the feed shaft, power-feed driving gears secured to the said countershaft in longitudinally spaced relation, a pair of power transmitting gears non-rotatably mounted one on each power-screw and slidable thereon, the said slidable gears being respectively movable in opposite directions from a position of each between the power-feed driving gears on the countershaft to a position in driven relation to one of said countershaft gears, a rapid traverse motor, a rapid traverse gear-train drive from said motor to a rapid traverse gear disposed between the said power-screws and longitudinally between the said driving gears on the countershaft in position to mesh with one or the other of the slidable gears on the said power-screws in movement of the said gears away from connection with the power-feed gears of the countershaft.

9. In a lathe that includes a reversibly driven feed shaft and parallel power-screws; a drive for the power-screws comprising a countershaft in constantly driven geared connection with the feed shaft, driving gears in longitudinally spaced relation on the said countershaft, a reversing tumbler in constantly driven geared connection with one of the said countershaft gears, a power transmitting gear non-rotatably mounted on one power-screw and slidable thereon into and out of meshed engagement with one of the said countershaft gears, and a power transmitting gear non-rotatably mounted on one said power-screw and slidable thereon into and out of engagement with a presented gear of the said reversing tumbler.

10. In a lathe that includes a feed shaft reversibly driven from the main power source of the lathe and parallel power-screws; a power-feed drive for the power-screws comprising a countershaft in constantly driven geared connection with the feed shaft, a pair of power-feed driving gears in longitudinally spaced relation on the said countershaft, a reversing tumbler in constantly driven geared connection with one of the said power-feed gears on the countershaft, a power transmitting gear non-rotatably mounted on one said power-screw and slidable thereon into and out of engagement with a presented gear of the said reversing tumbler, a power transmitting gear non-rotatably mounted on the other said power-screw and slidable thereon into and out of meshed engagement with the other of the said power-feed gears on the countershaft, a rapid traverse motor, a rapid traverse gear-train drive from said motor to a rapid traverse gear disposed between the said power-screws and longitudinally between the said driving gears on the countershaft in position to mesh with one or the other of the slidable gears on the said power-screws in movement of the said slidable gears away from connection with the power-feed gears on the countershaft and on the reversing tumbler.

WILLIAM M. McCONNELL.